US008915069B2

(12) United States Patent
Loman

(10) Patent No.: US 8,915,069 B2
(45) Date of Patent: Dec. 23, 2014

(54) ARRANGEMENT FOR INTRODUCING A LIQUID MEDIUM INTO EXHAUST GASES FROM A COMBUSTION ENGINE

(75) Inventor: Peter Loman, Sollentuna (SE)

(73) Assignee: Scania CV Ab (Publ) (SE)

( * ) Notice: Subject to any disclaimer, the term of this patent is extended or adjusted under 35 U.S.C. 154(b) by 82 days.

(21) Appl. No.: 13/877,526

(22) PCT Filed: Oct. 13, 2011

(86) PCT No.: PCT/SE2011/051222
§ 371 (c)(1),
(2), (4) Date: May 6, 2013

(87) PCT Pub. No.: WO2012/053960
PCT Pub. Date: Apr. 26, 2012

(65) Prior Publication Data
US 2013/0305696 A1    Nov. 21, 2013

(30) Foreign Application Priority Data

Oct. 22, 2010    (SE) ........................................ 1051099

(51) Int. Cl.
*F01N 3/00* (2006.01)
*F01N 3/24* (2006.01)
*B01F 5/04* (2006.01)
*B01F 3/04* (2006.01)
*F01N 3/20* (2006.01)
*F01N 13/14* (2010.01)
*F01N 3/28* (2006.01)

(52) U.S. Cl.
CPC . *F01N 3/24* (2013.01); *B01F 5/045* (2013.01); *B01F 5/0498* (2013.01); *B01F 3/04049* (2013.01); *F01N 3/2066* (2013.01); *F01N 13/141* (2013.01); *F01N 3/2892* (2013.01); F01N 2410/00 (2013.01); F01N 2470/08 (2013.01); F01N 2470/24 (2013.01); F01N 2610/02 (2013.01); F01N 2610/1453 (2013.01); Y02T 10/24 (2013.01); F01N 2240/20 (2013.01)
USPC ................... 60/295; 60/286; 60/287; 60/303; 60/324; 239/399; 239/432; 222/145.5; 222/145.6

(58) Field of Classification Search
USPC ........... 60/274, 286, 287, 295, 301, 303, 324; 239/398, 399, 416, 632; 222/137, 222/145.5, 145.6, 145.7
See application file for complete search history.

(56) References Cited

U.S. PATENT DOCUMENTS 6,722,123 B2 *  4/2004  Liu et al. ......................... 60/286
7,152,396 B2 * 12/2006  Cheng .............................. 60/286
(Continued)

FOREIGN PATENT DOCUMENTS

DE    10 2006 019 052 A1    10/2007
DE    10 2008 063 515 A1    6/2010
EP       1 785 606 A1       5/2007

OTHER PUBLICATIONS

International Search Report dated Feb. 8, 2012 issued in corresponding international patent application No. PCT/SE2011/051222.

*Primary Examiner* — Binh Q Tran
(74) *Attorney, Agent, or Firm* — Ostrolenk Faber LLP

(57) ABSTRACT

Arrangement for introducing a liquid medium into exhaust gases from a combustion engine: an exhaust gas line (2), an injection chamber (3) bounded in radial directions by a tubular wall (8), an injector (13) injects the liquid medium into the injection chamber; a mixing duct (14) to which the injection chamber has an outlet (10) for delivering exhaust gases; a bypass duct (15) which has an outlet (17) via which it is connected to the mixing duct, and an endwall (7) at the injection chamber's downstream end and demarcating the chamber from the mixing duct, such that the chamber's outlet is situated at the periphery of the endwall. The outlet of the bypass duct is close to the outlet of the injection chamber so that the exhaust gases which flow into the mixing duct via the chamber's outlet will collide with the exhaust gases which flow into the mixing duct via the outlet of the bypass duct.

12 Claims, 1 Drawing Sheet

(56) References Cited

U.S. PATENT DOCUMENTS

| | | |
|---|---|---|
| 7,762,061 B2 * | 7/2010 | Birkby et al. .................. 60/286 |
| 7,896,645 B2 * | 3/2011 | Loving .............................. 431/5 |
| 8,079,211 B2 * | 12/2011 | Levin et al. ..................... 60/286 |
| 8,397,492 B2 * | 3/2013 | Kowada .......................... 60/295 |
| 8,490,390 B2 * | 7/2013 | Henry et al. .................... 60/303 |
| 2007/0163241 A1 | 7/2007 | Meingast et al. |
| 2009/0255242 A1 | 10/2009 | Paterson et al. |

\* cited by examiner

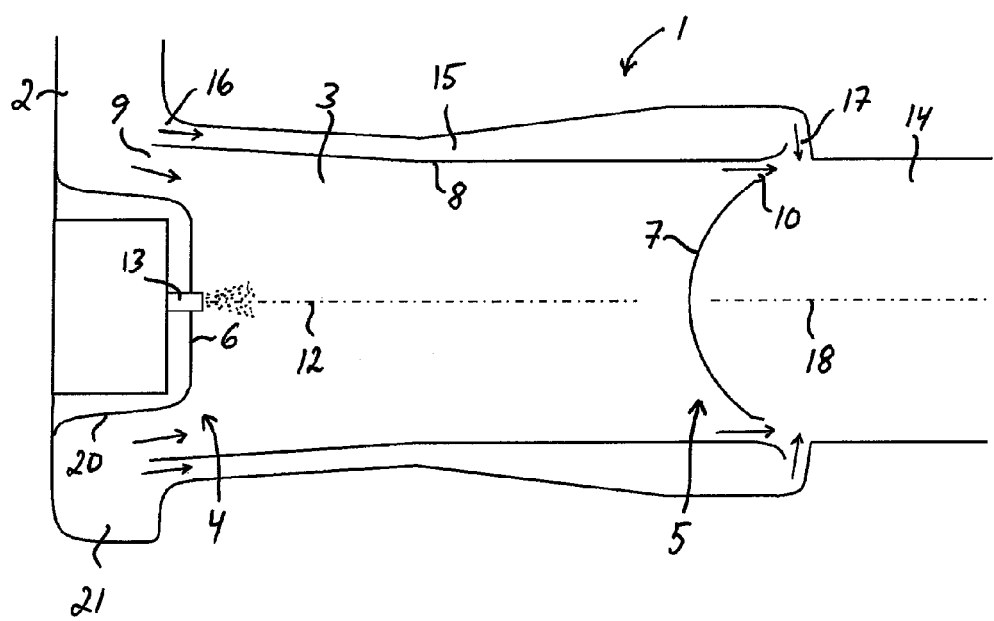

ARRANGEMENT FOR INTRODUCING A LIQUID MEDIUM INTO EXHAUST GASES FROM A COMBUSTION ENGINE

CROSS-REFERENCE TO RELATED APPLICATIONS

The present application is a 35 U.S.C. §§371 national phase conversion of PCT/SE 2011/051222, filed Oct. 13, 2011, which claims priority of Swedish Application No. 1051099-8, filed Oct. 22, 2010, the contents of which are incorporated by reference herein. The PCT International Application was published in the English language.

FIELD OF THE INVENTION, AND PRIOR ART

The present invention relates to an arrangement for introducing a liquid medium, e.g. urea, into exhaust gases from a combustion engine To meet prevailing exhaust cleaning requirements, today's motor vehicles are usually provided with a catalyst in the exhaust line to effect catalytic conversion of environmentally hazardous constituents of the exhaust gases to environmentally less hazardous substances. A method which has been employed for achieving effective catalytic conversion is based on injecting a reducing agent into the exhaust gases upstream of the catalyst. A reductive substance which forms part of, or is formed by, the reducing agent is carried by the exhaust gases into the catalyst and is adsorbed on active seats in the catalyst, resulting in accumulation of the reductive substance in the catalyst. The accumulated reductive substance may then react with and thereby convert an exhaust substance to a substance with less environmental impact. Such a reduction catalyst may for example be of SCR (selective catalytic reduction) type. This type of catalyst is hereinafter called SCR catalyst. An SCR catalyst reduces $NO_x$ in the exhaust gases. In the case of an SCR catalyst, a reducing agent in the form of urea is usually injected into the exhaust gases upstream of the catalyst. The injection of urea into the exhaust gases results in the formation of ammonia which then serves as the reductive substance which assists the catalytic conversion in the SCR catalyst. The ammonia accumulates in the catalyst by being adsorbed on active seats in the catalyst, and $NO_x$ present in the exhaust gases is converted to nitrogen gas and water when it is brought into contact in the catalyst with accumulated ammonia on the active seats in the catalyst.

When urea is used as reducing agent, it is injected into the exhaust line in the form of a liquid urea solution via an injection means. The injection means comprises a nozzle via which the urea solution is injected under pressure into the injection means in the form of a finely divided spray. In many operating states of a diesel engine the exhaust gases will be at a high enough temperature to be able to vaporise the urea solution so that ammonia is formed. It is difficult, however, to avoid part of the urea solution supplied coming into contact with and becoming attached to the internal wall surface of the exhaust line in an unvaporised state. When a combustion engine is run in a uniform way for a period of time, i.e. during steady-state operating conditions, no appreciable variations in the exhaust flow occur and the urea solution injected into the exhaust gases will therefore encounter substantially the same region of the exhaust line throughout said period of time. The relatively cool urea solution may cause local lowering of the temperature in that region of the exhaust line to below 100° C., which may lead to the formation in that region of a film of urea solution which is then entrained by the exhaust flow. When this film has moved a certain distance in the exhaust line, the water in the urea solution will boil away under the influence of the hot exhaust gases.

Solid urea will remain and be slowly vaporised by the heat in the exhaust line. If the supply of solid urea is greater than the vaporisation, solid urea will accumulate in the exhaust line. If the resulting layer of urea becomes thick enough, the urea and its decomposition products will react with one another to form urea-based primitive polymers known as urea lumps. Such urea lumps may over time block an exhaust line.

To facilitate the vaporisation of the injected urea solution, a vaporisation means may be provided in the exhaust line downstream of the injection point. This vaporisation means at its simplest take the form of a metal plate which is heated by the exhaust gases and which is intended for drops of reducing agent to become attached to and be vaporised on. The vaporisation means may or may not comprise catalytic material to speed up the vaporisation of the reducing agent.

OBJECT OF THE INVENTION

The object of the present invention is to propose a further development of an arrangement of the type described above in order to achieve an arrangement with a configuration which in at least some aspects affords an advantage compared therewith.

SUMMARY OF THE INVENTION

The object is achieved by means of an arrangement of the invention.

The arrangement according to the invention comprises:
a line intended to have exhaust gases flowing through it,
an injection chamber which has an upstream end and a downstream end, is bounded in radial directions by a tubular wall and has at its upstream end an inlet for receiving exhaust gases,
an injection means for injecting the liquid medium into the injection chamber,
a mixing duct which forms part of the line and is situated downstream of the injection chamber, which chamber has at its downstream end an outlet for delivering exhaust gases to the mixing duct, and
a bypass duct which is situated in the line upstream of the mixing duct and has an outlet via it is connected to the mixing duct.

The inlet of the injection chamber is configured for diverting a portion of the exhaust gases flowing through the line to cause these diverted exhaust gases to enter the injection chamber and thereafter to enter the mixing duct via the inlet of the injection chamber, while the bypass duct is configured for leading another portion of the exhaust gases flowing through the line into the mixing duct in order to be mixed there with the diverted exhaust gases. The injection chamber has at its downstream end an endwall by which it is demarcated from the mixing duct, and the outlet of the chamber is situated at the periphery of the endwall. In addition, the outlet of the bypass duct is situated close to the outlet of the injection chamber so that the exhaust gases which flow into the mixing duct via the outlet of the chamber will collide with the exhaust gases which flow into the mixing duct via the outlet of the bypass duct.

Drops of injected liquid medium which do not reach the tubular wall of the injection chamber and do not become vaporised during their passage through the chamber will reach the endwall at the chamber's downstream end. A portion of the liquid medium which reaches the endwall will be vaporised by the hot exhaust gases, while the remaining portion of the liquid medium, i.e. the portion which does not become vaporised after it has reached the endwall, runs along the endwall before being finally swept along with the exhaust flow out through the outlet of the injection chamber. In the mixing duct this exhaust flow collides with the exhaust flow from the outlet of the bypass duct. Turbulent flow occurs where these exhaust flows collide, helping to spread the liquid medium out in the exhaust gases. The turbulent flow also helps to break up the drops of liquid medium into smaller drops which vaporise more quickly.

According to an embodiment of the invention, the bypass duct surrounds the injection chamber and is demarcated from it by the chamber's tubular wall. The exhaust gases which flow through the bypass duct will deliver heat to this tubular wall, the inside of which serves as an internal wall surface of the injection chamber. Cooling of this internal wall surface of the chamber is thus counteracted, thereby hindering injected medium from becoming attached to this surface without being vaporised.

According to another embodiment of the invention, the exhaust gases from the bypass duct are arranged to flow into the mixing duct in substantially radial directions towards the centreline of the mixing duct via the outlet of the bypass duct, while the exhaust gases from the injection chamber are arranged to flow into the mixing duct in substantially axial directions via the outlet of the chamber. The exhaust flow from the outlet of the chamber thus collides at steep angles with the exhaust flow from the outlet of the bypass duct, contributing to very turbulent flow where these exhaust flows collide.

According to another embodiment of the invention, the outlet of the injection chamber is configured to constrict the exhaust flow so that the exhaust gases flowing through the chamber undergo acceleration during their passage through this outlet. High velocity of the exhaust flow from the outlet of the injection chamber is thus assured, contributing to very turbulent flow where this exhaust flow collides with the exhaust flow from the outlet of the bypass duct. Owing to their mass, the drops of liquid medium have greater inertia than the surrounding exhaust gases, with the result that the exhaust gases are accelerated more quickly than the drops during the passage through the outlet of the injection chamber and thereby temporarily reach a higher velocity than the drops. The resulting difference in velocity between the exhaust gases and said drops helps to break up the drops into smaller drops which vaporise more quickly. The difference in velocity also helps to enhance the transfer of heat from the exhaust gases to the drops.

According to another embodiment of the invention, the outlet of the bypass duct is configured to constrict the exhaust flow so that the exhaust gases flowing through the bypass duct undergo acceleration during their passage through this outlet. High velocity of the exhaust flow from the outlet of the bypass duct is thus assured, contributing to very turbulent flow where this exhaust flow collides with the exhaust flow from the outlet of the injection chamber.

According to another embodiment of the invention, the side of the endwall which faces in towards the injection chamber is of convex shape. This means that the liquid medium which reaches the endwall will be pushed radially outwards towards the periphery of the endwall, and thereby towards the outlet of the injection chamber, by the exhaust flow towards the endwall.

Other advantageous features of the arrangement according to the invention are indicated by the claims and the description set out below.

BRIEF DESCRIPTION OF THE DRAWING

The invention is described below in more detail on the basis of embodiment examples with reference to the attached drawing, in which:

FIG. 1 is a schematic longitudinal section through an arrangement according to an embodiment of the present invention.

DETAILED DESCRIPTION OF EMBODIMENTS OF THE INVENTION

FIG. 1 illustrates an arrangement 1 according to the present invention for introducing a liquid medium into exhaust gases from a combustion engine. The arrangement may for example be situated in an exhaust line upstream of an SCR catalyst in order to introduce a liquid reducing agent in the form of urea or ammonia into the exhaust line upstream of the SCR catalyst, or be situated in an exhaust post-treatment device in order to introduce a liquid reducing agent in the form of urea or ammonia upstream of an SCR catalyst which forms part of the exhaust post-treatment device.

The arrangement 1 comprises a line 2 intended to receive exhaust gases from a combustion engine and to lead them towards an exhaust post-treatment unit, e.g. in the form of an SCR catalyst. The arrangement 1 further comprises an injection chamber 3 with an upstream end 4 and a downstream end 5. The chamber 3 is bounded at axial ends in radial directions by a first endwall 6 at its upstream end 4 and a second endwall 7 at its downstream end 5. The chamber 3 is also bounded in radial directions by a tubular wall 8 which extends between its upstream end 4 and downstream end 5. The chamber 3 has an inlet 9 for receiving exhaust gases at its upstream end and an outlet 10 for delivering exhaust gases at its downstream end. The outlet 10 is situated at the periphery of the second endwall 7, preferably between the second endwall's periphery and the tubular wall 8. The outlet 10 is with advantage annular and arranged to extend round the second endwall 7 and round the centreline 12 of the injection chamber. The inlet 9 is likewise with advantage annular and arranged to extend round the centreline 12 of the injection chamber.

The side of the second endwall 7 which faces into towards the injection chamber 3 is with advantage of convex shape, as illustrated in FIG. 1. In the example illustrated the second endwall 7 is cup-shaped.

An injection means or device 13 for injecting the liquid medium is situated at the centre of the upstream end 4 of the injection chamber in order to inject the liquid medium towards the chamber's downstream end 5. In the example illustrated, the injection means or device 13 extends into the injection chamber 3 through the aforesaid first endwall 6. The injection means 13, which may for example comprise an injection nozzle, is arranged to inject the liquid medium under pressure into the chamber 3 in the form of a finely divided spray.

The injection chamber 3 is connected via its outlet 10 to a mixing duct 14 which forms part of the line 2 and which is situated downstream of the injection chamber 3. The injection chamber 3 is demarcated from the mixing duct 14 by the aforesaid second endwall 7.

A bypass duct 15 is provided in the line 2 upstream of the mixing duct 14 to lead exhaust gases into the mixing duct without passing through the injection chamber 3. The bypass duct 15 has an inlet 16 for receiving exhaust gases at its upstream end and an outlet 17 for delivering exhaust gases at its downstream end. The bypass duct 15 is connected to the mixing duct 14 via the outlet 17. The outlet 17 is with advantage annular and arranged to extend round the centreline 18 of the mixing duct.

In the example illustrated, the bypass duct 15 surrounds the injection chamber 3 and is demarcated from it by the aforesaid tubular wall 8 situated between the bypass duct and the injection chamber. The bypass duct 15 surrounds, and extends along the outside of, the tubular wall 8. In this case the bypass duct 15 is thus annular as seen in cross-section through the bypass duct. In the example illustrated the inlet 16 of the bypass duct is annular and is situated externally about the inlet 9 of the injection chamber.

The inlet 9 of the injection chamber is configured for diverting a portion of the exhaust gases flowing through the line 2 to cause these diverted exhaust gases to flow into the injection chamber 3 and thereafter into the mixing duct 14 via the outlet of the injection chamber, while the bypass duct 15 is configured for leading another portion of the exhaust gases flowing through the line 2 directly into the mixing duct 14 in order to be mixed there with said diverted exhaust gases.

The spray of liquid medium injected into the injection chamber 3 via the injection means or device 13 comes into contact in the chamber 3 with exhaust gases which enter the chamber via its inlet 9 in a substantially symmetrical flow round this spray. The exhaust gases flowing into the chamber 3 carry the liquid medium with them downstream in the injection chamber. During its movement downstream in the chamber 3, the liquid medium spreads out in the exhaust gases and part of it is vaporised by the heat of the exhaust gases. Liquid medium which does not vaporise in the injection chamber 3 reaches the endwall 7 at the chamber's downstream end. Part of the liquid medium which reaches this endwall 7 will be vaporised by the hot exhaust gases, while the remainder of this liquid medium runs along the endwall 7 before being finally swept along by exhaust flow out through the injection chamber's outlet 10 and into the mixing duct 14, in which the liquid medium spreads out in the exhaust gases and is vaporised by their heat.

The outlet 17 of the bypass duct is situated close to the outlet 10 of the injection chamber, immediately downstream of it, so that the exhaust gases which flow into the mixing duct 14 via the outlet 10 of the chamber will collide with the exhaust gases which flow into the mixing duct 14 via the outlet 17 of the bypass duct, resulting in turbulent exhaust flow in the mixing duct. The geometry close to the bypass duct's outlet 17 is such that the exhaust gases from the bypass duct 15 are caused to flow into the mixing duct 14 in substantially radial directions towards the centreline 18 of the mixing duct via the outlet 17 of the bypass duct, and the geometry close to the outlet 10 of the injection chamber 3 is such that the exhaust gases from the chamber are caused to flow into the mixing duct 14 in substantially axial directions via the chamber's outlet 10.

The outlet 10 of the injection chamber is configured to constrict the flow of exhaust gases passing through the injection chamber 3 so that they undergo acceleration during their passage through this outlet 10. In addition, the outlet 17 of the bypass duct is configured to constrict the flow of exhaust gases passing through the bypass duct 15 so that they undergo acceleration during their passage through this outlet 17.

In the embodiment illustrated in FIG. 1, the arrangement 1 comprises a bulging portion 20 which extends into the line 2, the upper side of which bulging portion serves as the aforesaid first endwall 6 of the injection chamber 3. Upstream of the chamber's inlet 9, the line has an annular space 21 which extends round the bulging portion 20. The inlet 9 of the injection chamber and the inlet 16 of the bypass duct are both connected to this annular space 21. In the example illustrated, the injection chamber's inlet 9 is situated between the bulging portion 20 and the tubular wall 8.

The arrangement according to the invention is particularly intended for use in a heavy motor vehicle, e.g. a bus, a tractor vehicle or a truck.

The invention is of course in no way restricted to the embodiments described above, since many possibilities for modifications thereof are likely to be obvious to specialists in the field without having to deviate from the invention's basic concept such as defined in the attached claims.

The invention claimed is:

1. An arrangement for introducing a liquid medium into exhaust gases from a combustion engine, the arrangement comprises:
   a line configured for exhaust gases to flow through it;
   an injection chamber which has an upstream end and a downstream end, is bounded in radial directions by a tubular wall and has at its upstream end an inlet for receiving exhaust gases;
   an injection device for injecting the liquid medium into the injection chamber;
   a mixing duct which forms part of the line and is situated downstream of the injection chamber in the exhaust gas flow, the injection chamber has an outlet at its downstream end for delivering exhaust gases to the mixing duct;
   a bypass duct situated in the line upstream of the mixing duct has an outlet via which it is connected to the mixing duct;
   wherein the inlet of the injection chamber is configured for diverting a portion of the exhaust gases flowing through the line to enter the injection chamber and thereafter to enter the mixing duct via the inlet of the injection chamber, while the bypass duct is configured for leading another portion of the exhaust gases flowing through the line into the mixing duct in order to be mixed there with the diverted exhaust gases;
   the injection chamber downstream end is comprised of an endwall which demarcates the injection chamber from the mixing duct, the endwall has a periphery;
   the outlet of the injection chamber is situated at the periphery of the endwall;
   the outlet of the bypass duct is situated close to the outlet of the injection chamber such that the exhaust gases which flow into the mixing duct via the outlet of the injection chamber collide with the exhaust gases which flow into the mixing duct via the outlet of the bypass duct.

2. An arrangement according to claim 1, wherein the outlet of the injection chamber is situated between the tubular wall and the periphery of the endwall.

3. An arrangement according to claim 1, wherein the bypass duct surrounds the injection chamber and is demarcated from the injection chamber by the tubular wall.

4. An arrangement according to claim 1, wherein the bypass duct is configured such that the exhaust gases from the bypass duct flow into the mixing duct in substantially radial directions towards the centreline of the mixing duct via the outlet of the bypass duct; and
   the injection chamber is configured such that the exhaust gases from the injection chamber flow into the mixing duct in substantially axial directions via the injection chamber outlet.

5. An arrangement according to claim 1, wherein the outlet of the injection chamber is configured to constrict the exhaust flow so that the exhaust gases flowing through the injection chamber undergo acceleration during their passage through the injection chamber outlet.

6. An arrangement according to claim 5, wherein the outlet of the bypass duct is configured to constrict the exhaust flow so that the exhaust gases flowing through the bypass duct undergo acceleration during their passage through the bypass duct outlet.

7. An arrangement according to claim 1, wherein the side of the endwall which faces in towards the injection chamber has a side of convex shape.

8. An arrangement according to claim 1, wherein the outlet of the injection chamber is annular and extends round the endwall.

9. An arrangement according to claim 1, wherein the outlet of the bypass duct is annular and extends round the centreline of the mixing duct.

10. An arrangement according to claim 1, wherein the injection device is situated at the centre of the upstream end of the injection chamber and is configured for injecting the liquid medium towards the downstream end of the chamber.

11. An arrangement according to claim 1, wherein the inlet of the injection chamber is annular and extends round the chamber's centreline.

12. An arrangement according to claim 1, wherein the outlet of the bypass duct is configured to constrict the exhaust flow so that the exhaust gases flowing through the bypass duct undergo acceleration during their passage through the bypass duct outlet.

* * * * *